United States Patent
Toyota et al.

(10) Patent No.: US 8,356,397 B2
(45) Date of Patent: Jan. 22, 2013

(54) MANUFACTURING METHOD OF CLUTCH FOR AUTOMATIC TRANSMISSION AND AUTOMATIC TRANSMISSION

(75) Inventors: Hideo Toyota, Hiroshima (JP); Naohiro Sakaue, Hiroshima (JP); Katsutoshi Mukai, Hiroshima (JP); Koichi Matsuura, Hiroshima (JP); Shinichiro Tenma, Hiroshima (JP); Masashi Morihiro, Hiroshima (JP); Jun Nakamura, Hiroshima (JP); Masanori Nakai, Hiroshima (JP)

(73) Assignee: Mazda Motor Corporation (JP)

( * ) Notice: Subject to any disclaimer, the term of this patent is extended or adjusted under 35 U.S.C. 154(b) by 767 days.

(21) Appl. No.: 12/499,571

(22) Filed: Jul. 8, 2009

(65) Prior Publication Data

US 2010/0072015 A1 Mar. 25, 2010

(30) Foreign Application Priority Data

Sep. 19, 2008 (JP) .................... 2008-240553

(51) Int. Cl.
*B21D 53/28* (2006.01)
*B21K 1/30* (2006.01)
*B23P 11/00* (2006.01)
*B23P 15/14* (2006.01)

(52) U.S. Cl. ............... 29/428; 29/893.1; 219/137 R (58) Field of Classification Search ........ 29/428, 29/893.1; 219/137 R; 192/3.33; 475/331, 475/276

See application file for complete search history.

(56) References Cited

U.S. PATENT DOCUMENTS

2008/0202884 A1   8/2008   Nishida et al.
2009/0101463 A1 *  4/2009   Hennessy et al. ............ 192/3.33

FOREIGN PATENT DOCUMENTS

| DE | 10 2005 025 979 A1 | 12/2006 |
|---|---|---|
| EP | 1 519 074 A2 | 3/2005 |
| EP | 1 818 557 A1 | 8/2007 |
| JP | 3121527 U | 4/2006 |
| JP | 2007-078191 A | 3/2007 |

OTHER PUBLICATIONS

Extended European Search Report dated Dec. 9, 2009; Application No. 09011386.1-2423.

* cited by examiner

*Primary Examiner* — Alexander P Taousakis
(74) *Attorney, Agent, or Firm* — Studebaker & Brackett PC; Donald R. Studebaker (57) ABSTRACT

In a clutch manufacturing method, inner peripheral portions of drum members, of two clutches are connected to a sleeve member, and a piston, a seal plate and a return spring are provided between the drum members, an insulator to apply electric isolation between the piston and the drum member or between the seal plate and another drum member is attached to either the piston or the seal plate. Then, the drum member, to which the electric isolation with the insulator is not applied, is connected to the sleeve member. Then, the piston, return sprig and seal plate are assembled to the sleeve member to which the drum member has been connected. Finally, the drum member, to which the electric isolation with the insulator has been applied, is connected to the sleeve member with electric welding.

10 Claims, 10 Drawing Sheets

FIG. 1

|  | 1st clutch (10) | 2nd clutch (20) | 1st brake (70) | 2nd brake (80) | 3rd brake (90) |
|---|---|---|---|---|---|
| 1st gear | O |  | (O) |  |  |
| 2nd gear | O |  |  | O |  |
| 3rd gear | O |  |  |  | O |
| 4th gear | O | O |  |  |  |
| 5th gear |  | O |  |  | O |
| 6th gear |  | O |  | O |  |
| R. gear |  |  | O |  | O |

MANUFACTURING METHOD OF CLUTCH FOR AUTOMATIC TRANSMISSION AND AUTOMATIC TRANSMISSION

BACKGROUND OF THE INVENTION

The present invention relates to a manufacturing method of a clutch for an automatic transmission which comprises two clutches to conduct connection/disconnection between of an input shaft and rotational elements of a transmission mechanism, and the automatic transmission equipped with such two clutches.

Conventionally, an automatic transmission, in which two clutches are provided on an input side of a transmission mechanism including plural planetary gears and a power transmission path of an input rotation to the transmission mechanism is selectively changed by these clutches to provide multistage shifts of the transmission, is known as an automatic transmission for automotive vehicles. Herein, respective input members (drum members) of the two clutches are connected to the input shaft. For example, according to the automatic transmission which is shown in FIG. 11 of Japanese Patent Laid-Open Publication No. 2007-78191, an inner peripheral portion of a drum member of one of clutches is welded to a flange portion of an input shaft, and to this drum member is coupled an inner peripheral portion of a drum member of the other of the clutches via a spline connection, thereby connecting the two clutches to the input shaft.

There are other types of automatic transmission in which the connection of the drum members of the two clutch members and the input shaft is conducted by connecting the inner peripheral portions of the drum members of the clutches to a sleeve member which is coupled to the input shaft via the spline connection by means of welding or spline connection.

Herein, in case the drum member of at least one of the clutches is coupled to the sleeve member via the spline connection, the spline connection may require a specified length in its axial direction. Accordingly, the sleeve member may be relatively long, so the entire length of the automatic transmission in the axial direction may become improperly long.

The connection with the electric welding between the drum members of the two clutches and the sleeve member may be considered as one of countermeasures for this problem. Herein, various elements of the clutch, such as a piston, a return spring, a spring receiver (a seal plate to form a centrifugal balance oil-pressure chamber), are provided between the drum members of the two clutches, so the electric-welding connection of the two drum members needs to be conducted via these various elements. Accordingly, the drum member of one of the clutches is welded to a specified position of the sleeve member, then the drum member of the other clutch is made contact the specified position of the sleeve member in a state in which the piston, spring and so on are disposed properly between the drum members. Here, in this state, an electric current is applied to the drum member of the other clutch and the sleeve member. Thus, the electric current flows through not only the contact portion between the drum member of one of the clutches and the sleeve member but the piston, spring, drum member of the other clutch, and so on. Accordingly, there is a possibility that welding would occur at a portion between the spring and the piston as well as the contact portion between the drum member of one of the clutches and the sleeve member. Further, there is a possibility that the piston, spring and the like have a welding deformation.

SUMMARY OF THE INVENTION

Accordingly, an object of the present invention is to provide a manufacturing method of a clutch for an automatic transmission and a transmission mechanism which can make the axial length of the sleeve member properly short, thereby shortening the entire axial length of the automatic transmission.

According to the present invention, there is provided a manufacturing method of a clutch for an automatic transmission which comprises two clutches provided on an input side of a transmission mechanism to conduct connection/disconnection between of an input shaft and the transmission mechanism, inner peripheral portions of respective drum members of which are connected to a sleeve member connected to the input shaft at different positions in an axial direction, a piston provided between the both drum members on an outer periphery side of the sleeve member, the piston forming an oil-pressure chamber of one of the clutches with the drum member of the one of the clutches, a seal plate provided between the drum member of the other of the clutches and the piston, the seal plate forming a centrifugal balance oil-pressure chamber of the one of the clutches, and a return spring provided between the piston and the seal plate to bias the piston toward the drum member of the one of the clutches in a state in which one end of thereof is received by the drum member of the other of the clutches via the seal plate, the manufacturing method comprising an insulator attaching step of attaching to either the piston or the seal plate an insulator to conduct an electric isolation between the piston and the drum member of the one of the clutches or between the seal plate and the drum member of the other of the clutches, a first connecting step of connecting the drum member, to which the electric isolation with the insulator is not applied, to the sleeve member, an assembling step of assembling the piston, return sprig and seal plate to the sleeve member to which the drum member has been connected through the first connecting step to form an assembly, and a second connecting step of connecting the drum member, to which the electric isolation with the insulator has been applied, to the sleeve member of the assembly which has been formed through the assembling step with electric welding.

According to the present invention, the electric current flows only through the contact portion between the drum member which is attached later (the one to which the electric isolation with the insulator has been applied) and the sleeve member, so that the welding occurs only at this contact portion. That is, the drum member attached later is electrically insulated from the seal plate by the insulator, so that when the electric current for welding is applied, it is prevented from flowing through the drum member which is attached earlier (the one to which the electric isolation with the insulator has not been applied), the piston, the return spring and the seal plate. Consequently, the welding between the drum member attached later and the sleeve member can be properly conducted without causing any improper welding at other portions, such as welding between the return spring and the piston, or without proving any improper welding deformation of the piston, spring and the like.

According to an embodiment of the present invention, the electric welding of the second connecting step is conducted by pressing the drum member to be connected toward the drum member which has been connected through the first connecting step against a biasing force of the return spring assembled in the assembly, making the inner peripheral portion of the drum member to be connected contact an end face of the sleeve member which is formed at a specified position of the sleeve member, and applying an electric current to the drum member and the sleeve member. Thereby, the direction of expansion/contraction of the return spring and the direction of welding between the drum member attached later and the sleeve member are identical. Accordingly, for example, the projection welding in which members to be welded are disposed between a pair of electrodes can be applied. Thus, no additional means for keeping the return spring compressed may be necessary at welding.

According to another embodiment of the present invention, a circular projection for welding of the drum member and another projection for stopper which is lower than the projection for welding in the axial direction are formed at the end face of the sleeve member, and the electric welding of the second connecting step is conducted until a tip portion of the projection for welding is so molten that an end face of the inner peripheral portion of the drum member comes to contact the projection which functions as a stopper. Thereby, the axial position relationship between the drum member attached later and the sleeve member can be ensured by the projection functioning as a stopper. Further, any spatters of welding which may be generated from the projection for welding which has been molten can be trapped inside a space enclosed by the drum member attached later, the projection functioning as a stopper, and the projection for welding, without scattering anywhere improperly.

According to another embodiment of the present invention, to the seal plate is attached the insulator to cover a back face of the seal plate which faces to the drum member to be electrically isolated from the seal plate and an inner peripheral end of the seal plate in the insulator attaching step. Thereby, any spatters of welding which may be generated from the projection for welding which has been molten can be trapped inside a space enclosed by the drum member attached later, the seal plate, the sleeve member, the projection for welding, and the insulator, without being scattered improperly. That is, the insulator can prevent the spatters from scattering through a space between the seal palate and the sleeve member.

According to another embodiment of the present invention, the inner peripheral portion of the drum member to be connected in the first connecting step is made in the axial direction contact another end face of the sleeve member which is provided at a different position from the end face of the sleeve member to which the drum member is welded in the second connecting step, and then the connection with electric welding of the drum member to the sleeve member in the second connecting step is conducted. Thereby, the two drum members are welded to the respective corresponding end faces of the sleeve member in the axial direction. Consequently, compared to a case in which at least one of the drum members and the sleeve member are coupled with the spline connection, the axial length of the sleeve member can be made properly short, thereby shortening the entire axial length of the automatic transmission.

Further, according to another aspect of the present invention, there is provided an automatic transmission, comprising two clutches provided on an input side of a transmission mechanism to conduct connection/disconnection between of an input shaft and the transmission mechanism, an input rotation being transmitted to the transmission mechanism via either one of the clutches, a sleeve member connected to the input shaft, respective drum members of the clutches, inner peripheral portions of which are connected to the sleeve member at different positions in an axial direction, a piston member provided between the drum members, the piston forming an oil-pressure chamber for one of the clutches, a return spring of the piston, and a seal plate to form a centrifugal balance oil-pressure chamber of one of the clutches, wherein the sleeve member has two end faces at different positions in an axial direction thereof, and the drum members of the clutches are connected to the sleeve member via respective inner peripheral portions of the drum members which are welded to the end faces from the axial direction, respectively. Thereby, likewise, the axial length of the sleeve member can be made properly short, thereby shortening the entire axial length of the automatic transmission, compared to the case in which at least one of the drum members and the sleeve member are coupled with the spline connection.

Other features, aspects, and advantages of the present invention will become apparent from the following description which refers to the accompanying drawings.

DETAILED DESCRIPTION OF THE INVENTION

Hereinafter, preferred embodiments of the present invention will be described.

Embodiment 1

Figure 1:
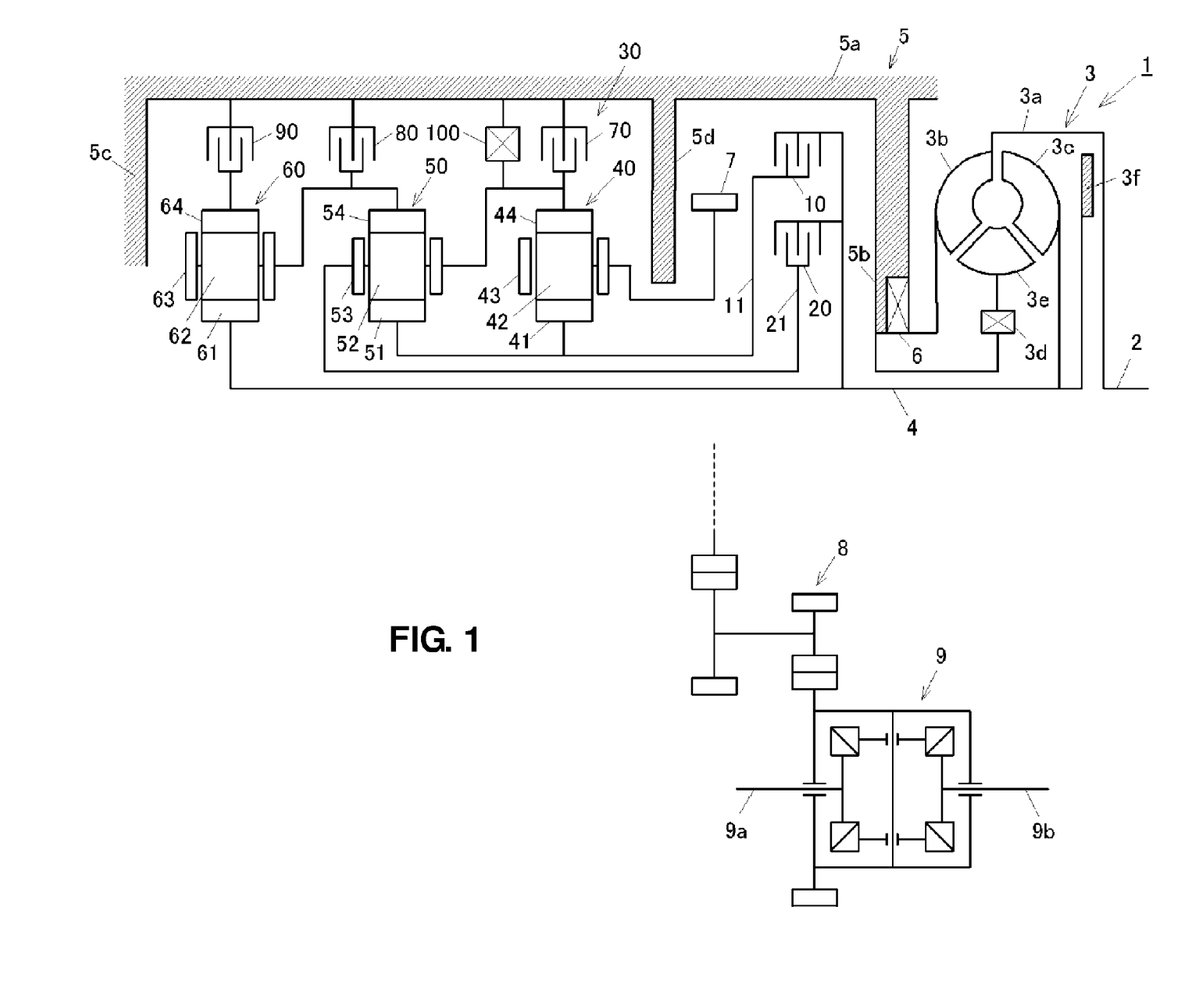
FIG. 1 is a skeleton diagram of an automatic transmission according to a first embodiment of the present invention.

FIG. 1 is a skeleton diagram of an automatic transmission according to a first embodiment of the present invention. The present automatic transmission 1, which is applied to an automotive vehicle with a laterally disposed engine, such as a front-engine front-drive type of vehicle, comprises a torque converter 3 attached to an engine output shaft 2, a first clutch 10 and a second clutch 20 to which a power from the torque converter 3 is inputted via an input shaft 4, and a transmission mechanism 30 to which the power is inputted from one of or both of the clutches 10, 20. These elements are stored in a transmission case 5 and disposed on an axis of the input shaft 4.

The transmission case 5 comprises a body portion 5a which forms an outer periphery, a front (torque-converter side) wall 5b which stores an oil pump 6 therein which is driven by an engine via the torque converter 3, an end cover 5c which covers an opening at a rear (anti torque-converter side) end portion of the body portion 5a, and a middle wall 5d which is provided at a middle portion of the body portion 5a.

The first and second clutches 10, 20 are stored between the front wall 5b and the middle wall 5d, and the transmission mechanism 30 is stored between the middle wall 5d and the end cover 5c. An output gear 7 to take out the power from the transmission mechanism 30 is disposed between the clutches 10, 20 and the middle wall 5d. The power taken out by the output gear 7 is transmitted to a differential gear 9 via a counter drive mechanism 8, thereby driving right and left drive axels 9a, 9b.

The torque converter 3 comprises a case 3a which is connected to the engine output shaft 2, a pump 3b which is fixed in the case 3a, a turbine 3c which is disposed facing to the pump 3b and driven by the pump 3b with operational oil, a stator 3e which is provided between the pump 3b and the turbine 3c and supported at the transmission case 5 via a one-way clutch 3d so as to achieve a torque increase function, and a lockup clutch 3f which is provided between the case 3a and the turbine 3c and connects the engine output shaft 2 to the turbine 3c directly via the case 3a. Thereby, the rotation of the turbine 3c is transmitted to the first and second clutches 10, 20 and the transmission mechanism 30 via the input shaft 4.

The transmission mechanism 30 comprises first, second and third planetary gear sets 40, 50, 60 (hereinafter, referred to as "first, second and third gear sets"). These gear sets 40, 50, 60 are disposed between the middle wall 5d and the end cover 5c in the transmission case 5 in this order from the front side.

Further, in addition to the first and second clutches 40, 50, a first brake 70, a second brake 80, and a third brake 90, as frictional elements of the transmission mechanism 30, are disposed in this order from the front side. Further, a one-way clutch 100 is disposed beside the first brake 70.

The first, second and third gear sets 40, 50, 60, which are a single pinion type of planetary gear set, respectively comprise sun gears 41, 51, 61, plural pinions 42, 52, 62 to engage with the sun gears 41, 51, 61, carriers 43, 53, 63 to support the pinions 42, 52, 62 respectively, and ring gears 44, 54, 64 to engage with the pinions 42, 52, 62.

The input shaft 4 is connected to the sun gear 61 of the third gear set 60. The sun gear 41 of the first gear set 40 and the sun gear 51 of the second gear set 50, the ring gear 44 of the first gear set 40 and the carrier 53 of the second gear set 50, and the ring gear 54 of the second gear set 50 and the carrier 63 of the third gear set 60 are connected, respectively. The output gear 7 is connected to the carrier 43 of the first gear set 40.

The sun gear 41 of the first gear set 40 and the sun gear 51 of the second gear set 50 are connected to an output shaft 11 of the first clutch 10 and then connected to the input shaft 4 via the first clutch 10. The carrier 53 of the second gear set 50 is connected to an output shaft 21 of the second clutch 20 and then connected to the input shaft 4 via the second clutch 20.

Further, the ring gear 44 of the first gear set 40 and the carrier 53 of the second gear set 50 are connected to the transmission case 5 via the first brake 70 and the one-way clutch 100. The ring gear 54 of the second gear set 50 and the carrier 63 of the third gear set 60 are connected to the transmission case 5 via the second brake 80. The ring gear 64 of the third gear set 60 is connected to the transmission case 5 via the third brake 90.

The automatic transmission 1 having the above-described structure achieves shifts for the six-forward gears and a reverse gear by combination of connection of the first and second clutches 10, 20 and the first, second and third brakes 70, 80, 90. Relationships of the combination and the selected gears are shown by a connection table of FIG. 2.

Figure 2:
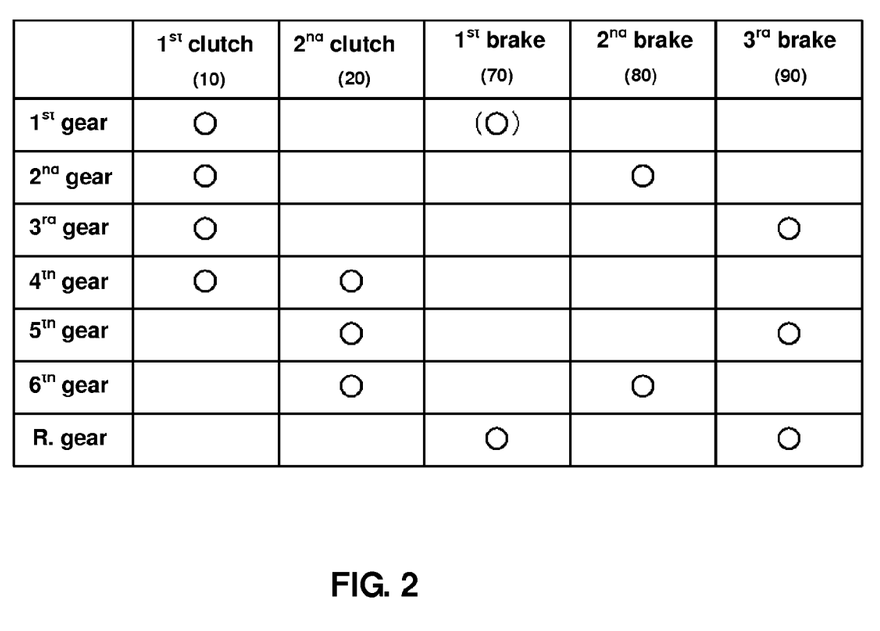
FIG. 2 is a connection table of the automatic transmission of FIG. 1.

That is, the first clutch 10 and the first brake 70 are connected to each other in the first gear, where the rotation of the input shaft 4 is inputted to the sun gear 41 of the first gear set 40 with a great speed reduction by the first gear set 40, and then outputted from the carrier 43 of the first gear set 40 to the output gear 7. Herein, the first brake 70 is connected only in the first gear state where the engine brake works. In the first gear state where the engine brake does not work, the one-way clutch 100 is locked up for accomplishing the first gear.

In the second gear, the first clutch 10 and the second brake 80 are connected to each other, where the rotation of the input shaft 4 is inputted to the sun gear 41 of the first gear set 40 and at the same time inputted to the ring gear 44 of the first gear set 40 via the second gear set 50 with a smaller ratio of speed reduction than the first gear, and then outputted from the carrier 43 of the first gear set 40 to the output gear 7.

In the third gear, the first clutch 10 and the third brake 90 are connected to each other, where the rotation of the input shaft 4 is inputted to the sun gear 41 of the first gear set 40 and at the same time inputted to the ring gear 44 of the first gear set 40 via the third gear set 60 and the second gear set 50 with a smaller ratio of speed reduction than the second gear, and then outputted from the carrier 43 of the first gear set 40 to the output gear 7.

In the fourth gear, the first clutch 10 and the second clutch 20 are connected to each other, where the rotation of the input shaft 4 is inputted to the sun gear 41 of the first gear set 40 and at the same time inputted to the ring gear 44 of the first gear set 40 via the second gear set 50 directly. Thereby, the whole first gear set 40 rotates along with the input shaft 4, so that the rotation of the input shaft 4 is outputted from the carrier 43 to the output gear 7 with the speed reduction ratio of 1.

In the fifth gear, the second clutch 20 and the third brake 90 are connected to each other, where the rotation of the input shaft 4 is inputted to the ring gear 44 of the first gear set 40 via the second gear set 50 directly and at the same time inputted to the sun gear 41 of the first gear set 40 via the third gear set 630 and the second gear set 50. Thereby, the rotation of the input shaft 4 is outputted from the carrier 43 of the first gear set 40 to the output gear 7 with the speed increase.

In the sixth gear, the second clutch 20 and the second brake 80 are connected to each other, where the rotation of the input shaft 4 is inputted to the ring gear 44 of the first gear set 40 via the second gear set 50 directly and at the same time inputted to the sun gear 41 of the first gear set 40 via the second gear set 50. Thereby, the rotation of the input shaft 4 is outputted from the carrier 43 of the first gear set 40 to the output gear 7 with a greater speed increase ratio than the fifth gear.

Further, in the reverse gear, the first brake 70 and the third brake 90 are connected, where the rotation of the input shaft 4 is inputted to the sun gear 41 of the first gear set 40 via the second gear set 60 and the third gear set 50. Herein, the rotational direction is reversed by the second gear set 50, so that the rotation of the input shaft 4 is outputted from the carrier 43 of the first gear set 40 to the output gear 7 with a reverse rotation.

As described, the transmission mechanism 30 which comprises two clutches 10, 20, three single-pinion type of planetary gear sets 40, 50, 60 and three brakes 70, 80, 90 materializes the automatic transmission 1 which achieves shifts for the six-forward gears and the reverse gear with these components.

Hereinafter, the connection of the input shaft 4 and the two clutches 10, 20, which is the feature of the present invention, will be described specifically referring to FIG. 3, a sectional view of the automatic transmission 1.

Figure 3:
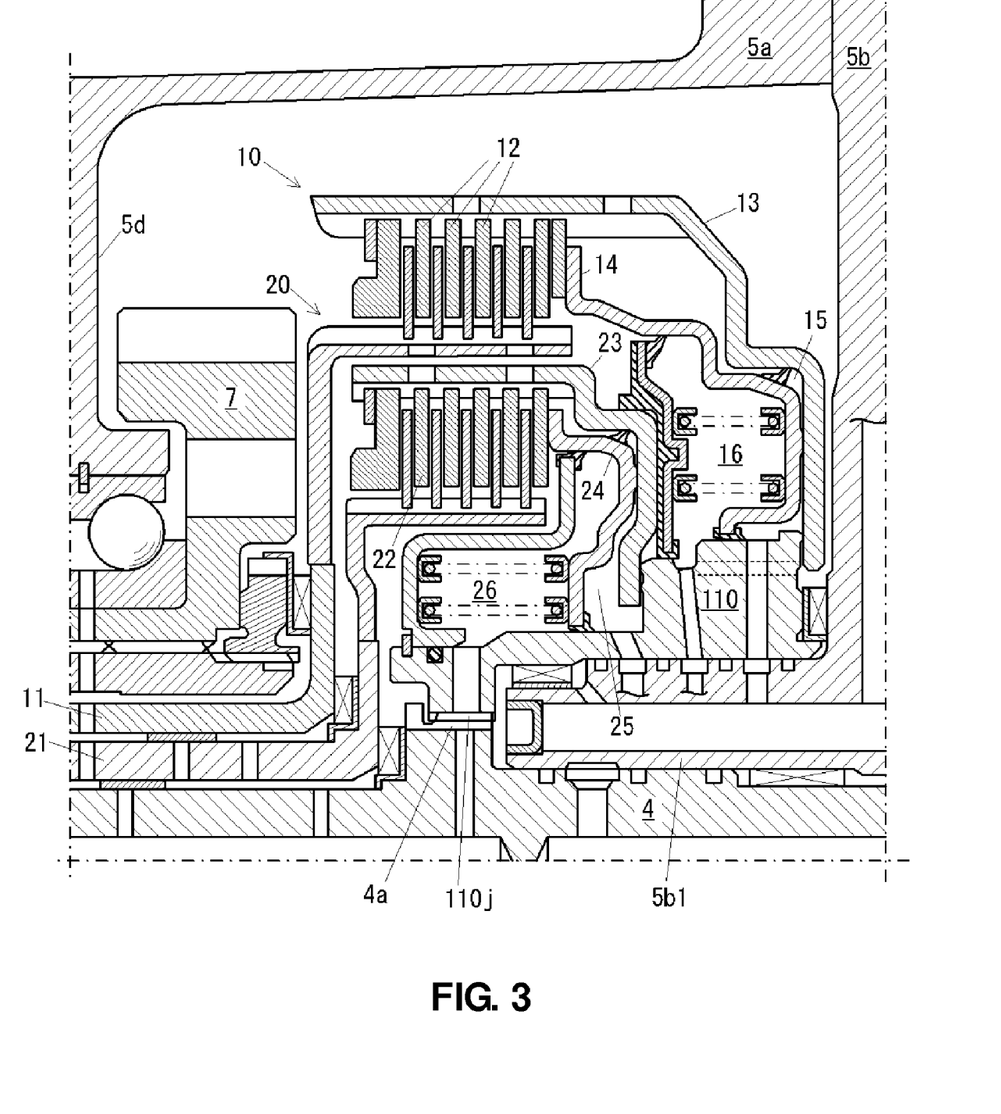
FIG. 3 is a sectional view of a part of the automatic transmission.

FIG. 3 shows the elements of the automatic transmission 1 which are provided between the front wall 5*b* and the middle wall 5*d* in the transmission case 5.

As shown in the figure, the two clutches 10, 20, which are a multi-plate clutch, comprises plural friction plates 12, 22, drum members 13, 23 which support the plural friction plates 12, 22 at their outer peripheries in such a manner the plates can move in the axial direction, hubs 11, 21 which support the plural friction plates 12, 22 at their inner peripheries in such a manner the plates can move in the axial direction and are output members of the clutches, pistons 14, 24 which presses the plural friction plates 12, 22, and connection oil-pressure chambers 15, 25 into which the oil pressure (operational oil) to press the pistons 14, 24 is supplied. Further, centrifugal balance chambers 16, 26 are formed respectively behind the pistons 14, 24 on the opposite sides to the connection oil-pressure chamber 15, 25.

The two clutches 10, 20 are disposed side by side in the radial direction, and the drum members 13, 23 as their input members are connected to a sleeve member 110 at their inner peripheral portions. These connections will be described later.

The sleeve member 110 is coupled to a boss portion 5*b*1, which extends toward the rear side (to the left in the figure) from the central portion of the front wall 5*b* and supports the input shaft 4 therein, so as to slide on and rotate around the boss portion 5*b*1. The sleeve member 110 extends toward the rear side beyond a front end of the boss portion 5*b*1, and is connected to the input shaft 4 at its extending portion. Specifically, a spline 110*j* which is formed at the inner peripheral face of the sleeve member 110 engages with a spline 4*a* which is formed at the outer peripheral face of the input shaft 4. Accordingly, the drum members 13, 23 of the two clutches 10, 20 rotate together with the input shaft 4 via the sleeve member 110.

Figure 4:
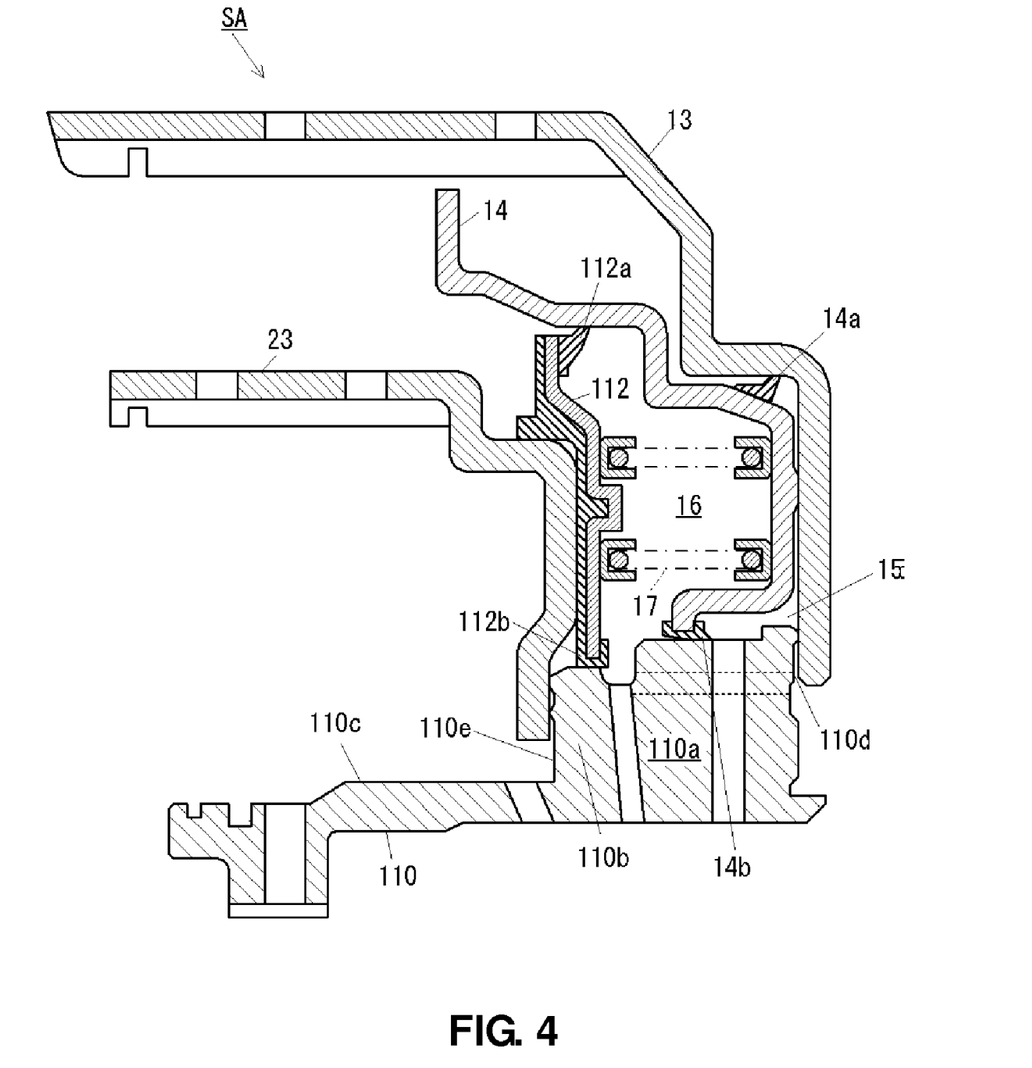
FIG. 4 is a view showing a subassembly which is partially included in FIG. 3.

FIG. 4 shows a subassembly SA which comprises the two clutches 10, 20 and the sleeve member 110 and is formed through the manufacturing method according to the present invention.

Specifically, the subassembly SA comprises the drum member 13 of the clutch 10, the piston 14, the return spring 17 which presses the piston 14 toward the front (to the right in the figure), the drum member 23 of the clutch 20, the sleeve member 110, and a seal plate 112 which partitions the centrifugal balance chamber 16 of the clutch 10.

The sleeve member 110 comprises, as shown in the figure, a front portion 110*a* which has a large outer peripheral diameter, a central portion 110*b* which has a smaller outer peripheral diameter than the front portion 110*a*, and a rear portion 110*c* which has a smaller outer peripheral diameter than the central portion 110*b*. An end face of the inner peripheral portion of the drum member 13 of the clutch 10 is welded to an end face 110*d* of the front side (the right side in the figure) of the front portion 110*a* in the axial direction. Further, an end face of the inner peripheral portion of the drum member 23 of the clutch 20 is welded to an end face 110*e* of the rear side (the left side in the figure) of the central portion 110*b* in the axial direction. Consequently, compared to a case in which at least one of the drum members and the sleeve member are coupled with the spline connection, the axial length of the sleeve member can be made properly short, thereby shortening the entire axial length of the automatic transmission.

Between the drum members 13, 23 connected to the sleeve member 110 is provided the piston 14 so as to move in the axial direction on the front portion 110*a* of the sleeve member 110. The seal plate 112 is provided so as to move in the axial direction on the central portion 110*b*.

The piston 14 is disposed on the rear side (on the left side in the figure) of the drum member 13 of the clutch 10, and a connection oil-pressure chamber 15 is formed between the piston 14 and the drum member 13. The piston 14 has a seal member 14*a* to seal a gap between the piston 14 and the drum member 13 at its central portion, and it has a seal member 14*b* to seal a gap between the piston 14 and the front portion 110*a* of the sleeve member 110 at its inner peripheral end portion.

The seal plate 112 is disposed on the front side (on the right side in the figure) of the drum member 23 of the clutch 20 and partitions the centrifugal balance chamber 16 with the piston 14, receiving a rear end of the return spring 17. The seal plate 112 has a seal member 112*a* to seal a gap between the seal plate 112 and the piston 14 at its outer peripheral end, and its has a seal member 112*b* to seal a gap between the seal plate 112 and the central portion 110*b* of the sleeve member 110.

The seal member 112*b*, which is made from an electric-isolation material, is attached to the seal plate 112 in such a manner that it covers not only the inner peripheral end of the seal plate 112 but the back face of the seal plate 112 which faces to the drum member 23 of the clutch 20, so that the seal plate 112 can be isolated electrically from the drum member 23. The reason for this will be described later.

The return spring 17 is disposed between the piston 14 and the seal plate 112 so as to support the piston 14 and the seal plate 112 at specified positions in the radial direction, respectively. The return spring 17 is kept in its contraction state in the subassembly SA, so that the piston 14 is kept in its contact state with the drum member 13 of the clutch 10 and the seal plate 112 is kept in its contact state with the drum member 23 of the clutch 20.

Next, the formatting method of the subassembly SA will be described.

Figure 5:
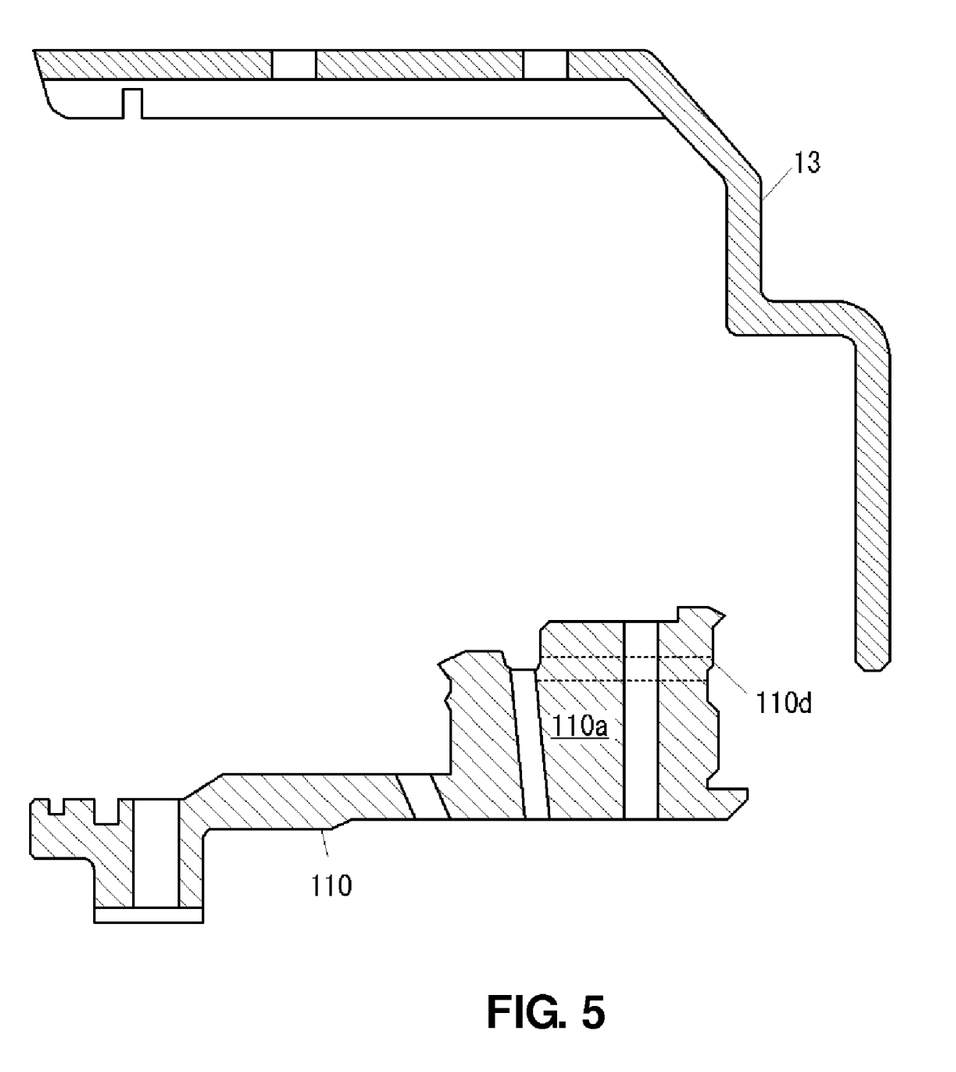
FIG. 5 is a diagram describing a step of an assembling method of the subassembly of FIG. 4.

Initially, as shown in FIG. 5, the inner peripheral end face of the drum member 13 of the clutch 10 is welded to the end face 110*d* of the front portion 110*a* of the sleeve member 110. When spatters of welding are generated and attached, they will be removed after the welding.

Figure 6:
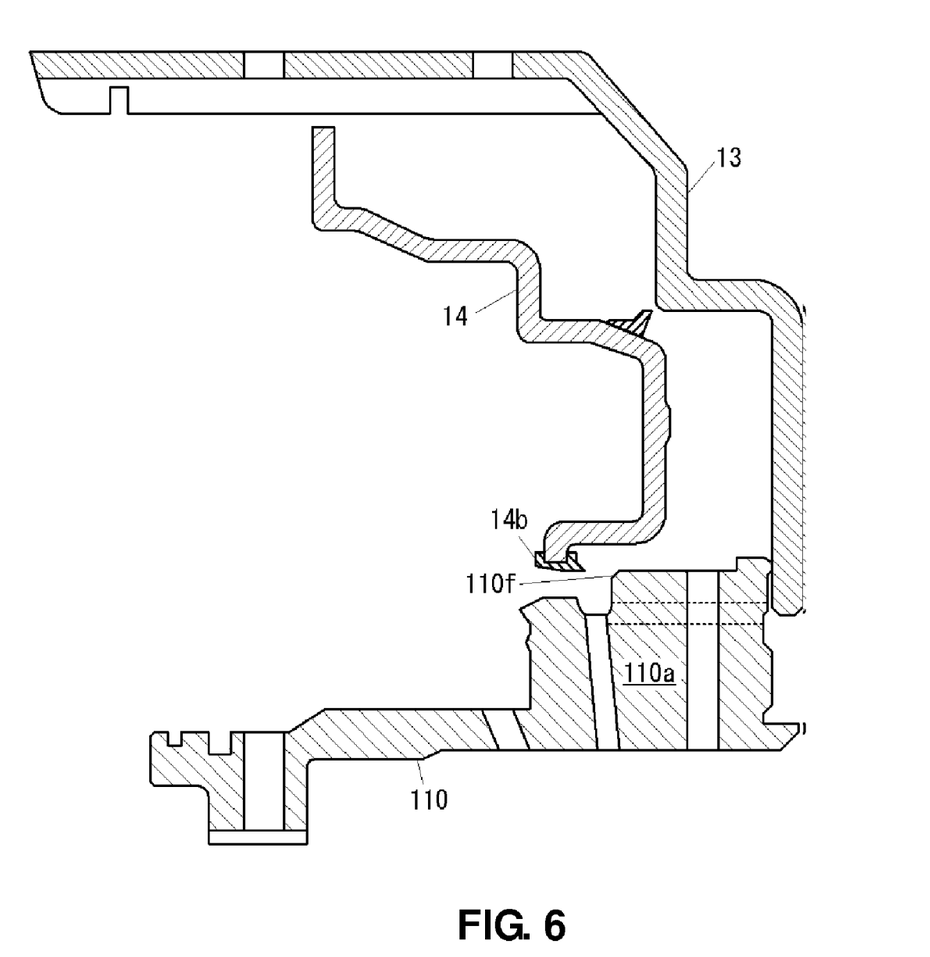
FIG. 6 is a diagram describing another step of the assembling method of the subassembly, which follows the step of FIG. 5.

Then, as shown in FIG. 6, the piston 14 is inserted onto the front portion 110*a* of the sleeve member 110 to which the drum member 13 has been welded. Herein, in order to facilitate the insertion, a round-cornered portion 110*f* which guides the inner peripheral end (seal member 14*b*) of the piston 14 is formed at a connection portion between the rear end face and the outer peripheral face of the front portion 110*a* of the sleeve member 110.

Figure 7:
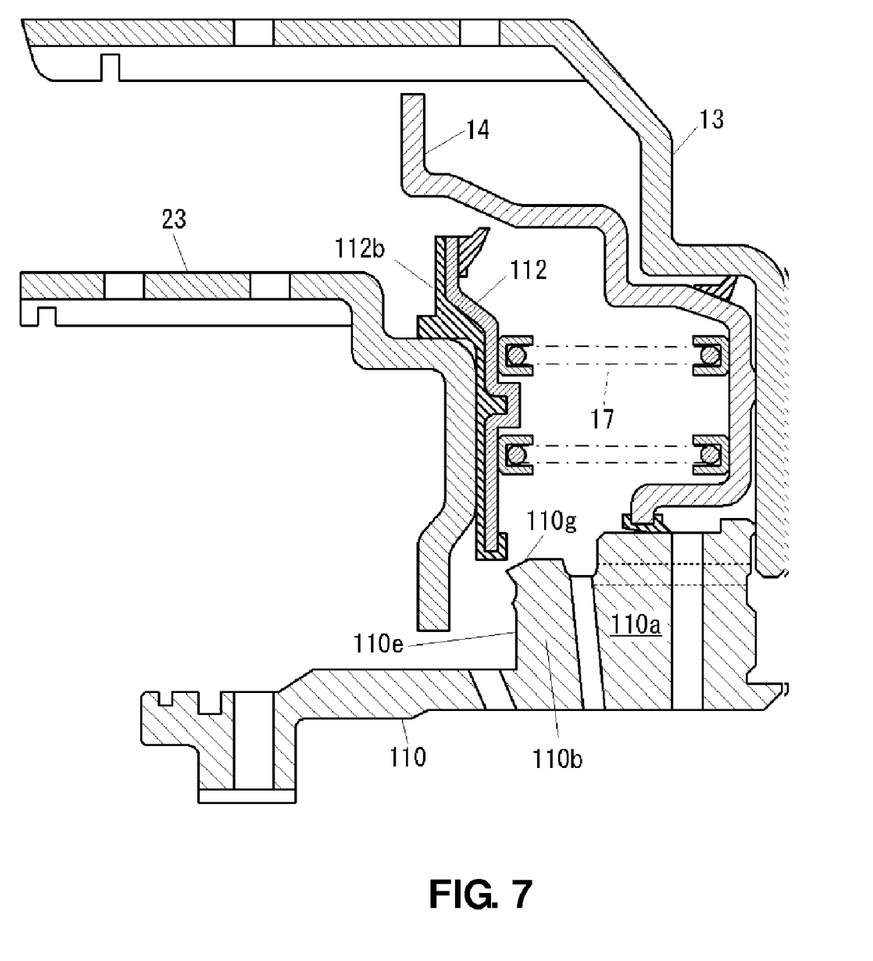
FIG. 7 is a diagram describing another step of the assembling method of the subassembly, which follows the step of FIG. 6.

Subsequently, as shown in FIG. 7, a unit of the seal plate 112 and the drum member 23 are assembled into another unit of the sleeve member 110 and the piston 14, setting the return spring 17 between the both units. Specifically, in a state in which the return spring 17 is supported at the piston 14 and the seal plate 112 and the front side of the drum member 23 engages with the seal member 112*b* of the seal plate 112, the seal plate 112 is inserted onto the central portion 110*b* of the sleeve member 110 as the return spring 17 is compressed to its contraction state. Herein, the drum member 23 is in its engagement state with the seal plate 112, so that the position of the drum member 23 is fixed in the radial direction according to the insertion of the seal plate 112 onto the central portion 110*b* of the sleeve member 110. Herein, in order to facilitate this insertion, a round-cornered portion 110*g* which guides the inner peripheral end (seal member 112*b*) of the seal plate 112 is formed at a connection portion between the rear end face and the outer peripheral face of the middle portion 110*b* of the sleeve member 110.

The above-described assembling, that is, the insertion is conducted until the end face of the inner peripheral portion of the drum member 23 comes to contact the end face 110e of the central portion 110b of the sleeve member 110.

Figure 8:
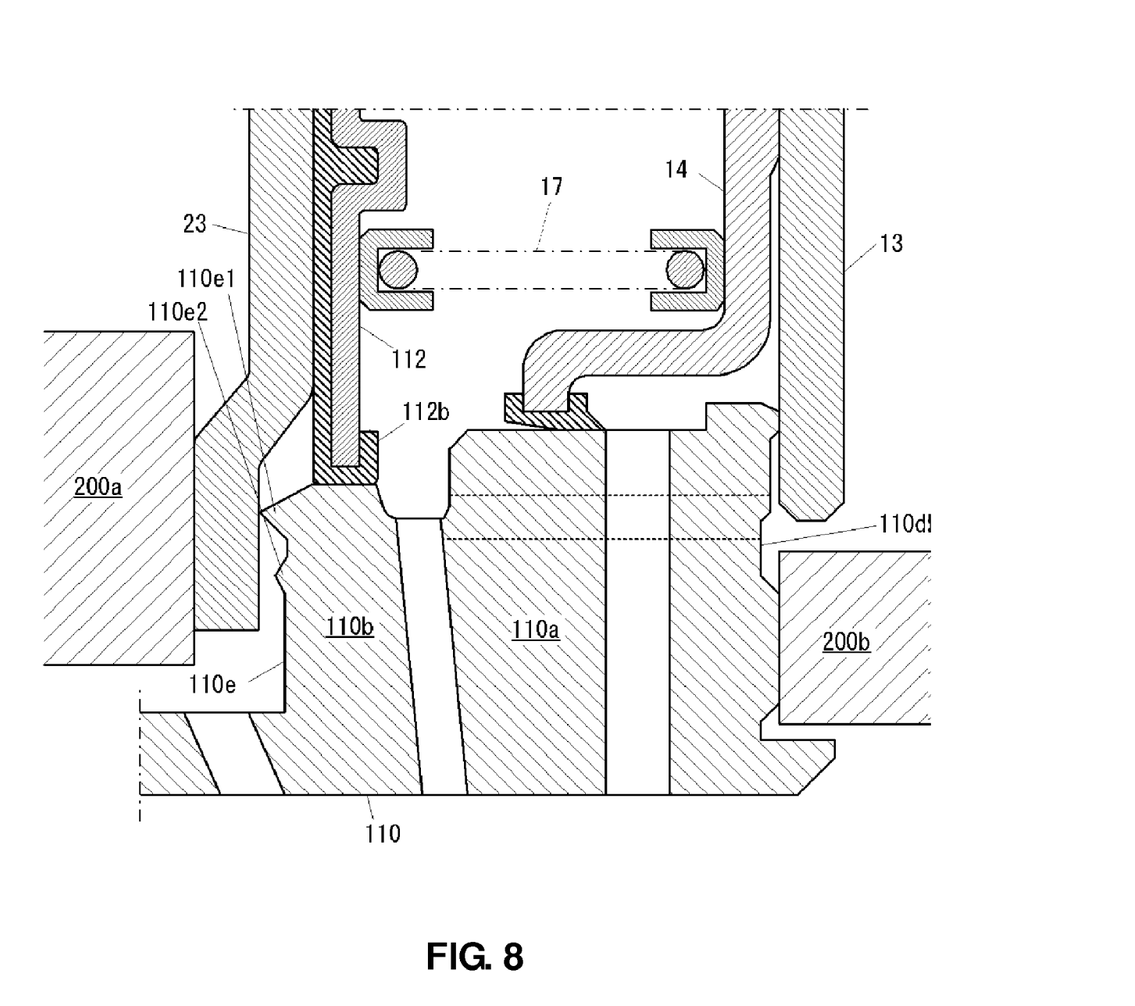
FIG. 8 is a view showing a contact state of a drum member and a sleeve member.

Specifically, as shown in FIG. 8 showing the contact portion between the drum member 23 and the sleeve member 110, the front end face of the inner peripheral portion of the drum member 23 is made contact a circular (ring-shaped) projection 110e1 which is formed at the end face 110e so as to project rearward in the axial direction.

After the contact of the drum member 23 and the projection 110e1, the electric current for welding is applied to the drum member 23 and the sleeve member 110. This application of the electric current is conducted by an electrode 200a to contact the drum member 23 from the rear side (left side in the figure) and an electrode 200b to contact the sleeve member 110 from the front side (right side in the figure). These electrodes 200a, 200b constitute a pair of electrodes of the projection welding apparatus, which are disposed so as to locate the drum member 23 and the sleeve member 110 between them. In other wards, these electrodes 200a, 200b function as means for pressing the drum member 23 and the projection 110e1 against a basing force of the return spring 17, so that these two members can be keep in their contact state.

When the electric current for welding is applied to the drum member 23 and the sleeve member 110, it flows through the projection 110e1. Thereby, only the projection 110e1 is molten and the drum member 23 is welded to the sleeve member 110.

This is because the seal member 112b attached to the seal plate 112 is made from the electric-isolation material, thereby the seal plate 112 is electrically insulated from the drum member 23. That is, this is because the electric insulation is achieved in such a manner that the electric current does not flow through the sleeve member 110, the drum member 13, the piston 14, the return spring 17, the seal plate 112 and the drum member 23 (the electric current's flowing via the drum member 13, the piston 14, the return spring 17, and the seal plate 112 is prevented).

If the seal member 112b made from the electric-isolation material did not exist, the seal plate 112 contacted the drum member 23, so that the electric current would flow through not only the projection 110e1 but the drum member 13, the piston 14, the return spring 17, and the seal plate 112. Thus, there is the possibility that the welding would occur between the return spring 17 and the piston 14, or between the seal plate 112 and the drum member 23, for example. Further, there is the possibility that the piston 14 and the seal plate 112 would have a heat deformation (welding deformation) due to the electric current's flowing therethrough.

Figure 9:
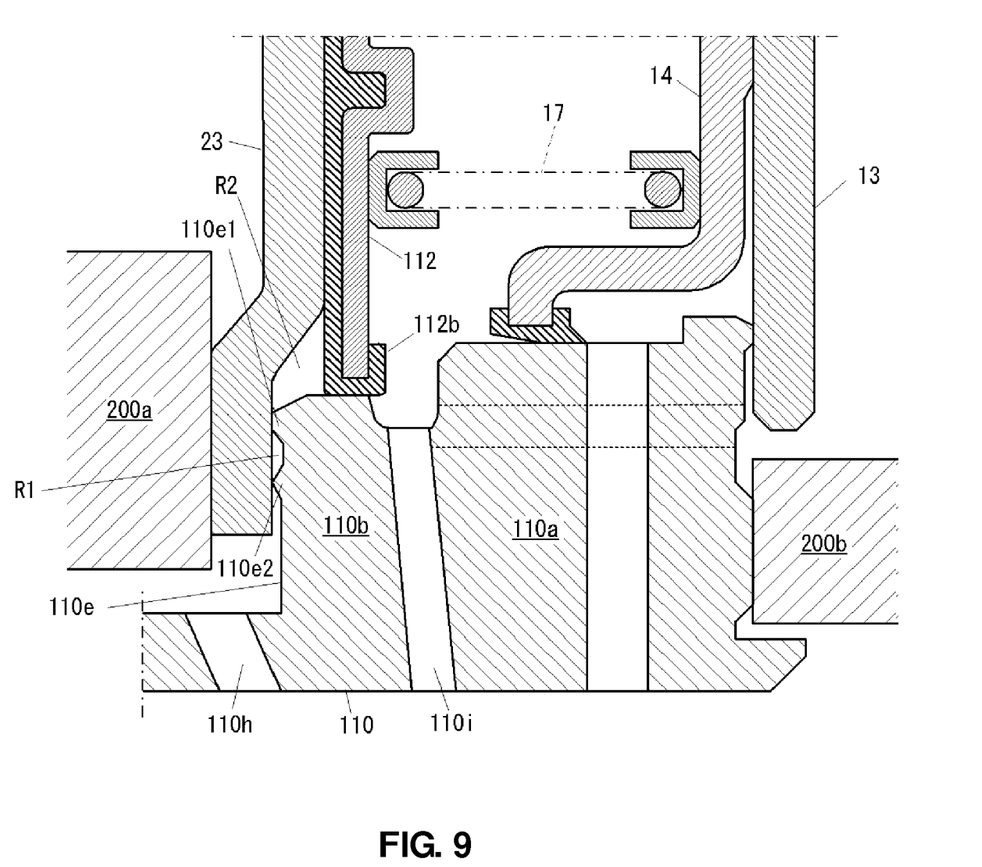
FIG. 9 is a view showing a welding state of the drum member and the sleeve member.

The application (welding) of the electric current to the drum member 23 and the sleeve member 112 is conducted (continues) until the front end face of the inner peripheral portion of the drum member 23 comes to contact a projection 110e2 which is formed at the end face 110e of the central portion 110b so as to project rearward in the axial direction as shown in FIG. 9.

The projection 110e2 has a lower height (in the axial direction) than the projection 110e1 as shown in FIG. 8, and it is formed coaxially with and inside the projection 110e1.

That is, the projection 110e1 is the one for welding to the drum member 23 which is formed at the sleeve member 110, and the projection 110e2 is the one which functions as a stopper which restricts the axial move of the drum member 23 caused by the electrodes 200a, 200b. The axial position relationship between the drum member 23 and the sleeve member 110 can be ensured by the projection functioning as a stopper 110e2.

Herein, the projection 110e2 has another function than the one as the stopper, in that any spatters of welding which may be generated from the projection for welding 110e1 which has been molten can be trapped inside a space R1 enclosed by the drum member 23, the projection functioning as the stopper 110e2, the sleeve member 110 and the projection for welding 110e1, as shown in FIG. 9. Thereby, the spatter scattering toward the inner peripheral side from the projection 110e1 can be prevented from coming into any improper places, such as an oil passage 110h of the sleeve member 110.

The spatters scattering toward the outer peripheral side from the projection 110e1 can be trapped inside a space R2 enclosed by the drum member 23, the projection for welding stopper 110e1, the sleeve member 110 and the seal plate 112, as shown in FIG. 9. Specifically, the seal member 112b attached to the seal plate 112 seals the portion between the seal plate 112 and the sleeve member 110 by covering the inner peripheral end of the seal plate 112. Thereby, the spatter can be prevented from coming into any improper places through these, such as an oil passage 110i of the sleeve member 110.

According to the present embodiment, the welding between the drum member 23 and the sleeve member 110 can be properly conducted without causing any improper welding at other portions, such as welding between the return spring 17 and the piston 14, or without proving any improper welding deformation of the piston 14, spring 17 and the like.

The present invention should not be limited to the above-described embodiment.

That is, according to the above-described embodiment, as shown in FIGS. 8 and 9, the two electrodes 200a, 200b are provided so as to press the drum member 23 and the sleeve member 110 from the both sides against the biasing force of the return spring, so that the welding of the drum member 23 and the sleeve member 110 is conducted in the axial direction. However, the present invention is not limited to this.

This method may be possible in case the direction of expansion/contraction of the return spring 17 and the direction of welding between the drum member 23 and the sleeve member 110 are identical. That is, the electrodes 200a, 200b also function as means for keeping the return spring 17 compressed at the welding.

Accordingly, in case the direction of the welding between the drum member 23 and the sleeve member is different from the one of expansion/contraction of the return spring, that is, the axial direction, some additional means for keeping the return spring compressed may be necessary at welding, which may require some more manufacturing time.

Further, while the two drum members 13, 23 are welded to the sleeve member 110 in the axial direction according to the above-described embodiment, as shown in FIGS. 3 and 4, the present invention is not limited to this. For example, the drum member to which the electric insulation with the insulator is not applied (i.e., the drum member 13) may be connected to the sleeve member 110 with any other means than the electric welding. In this case, however, the axial length of the sleeve member may be longer, so that the entire length of the automatic transmission in the axial direction may be longer.

Moreover, the drum member to which the electric insulation is applied is the drum member 23, so the seal member 112b as the insulator to electrically insulate the drum member 23 from the seal plate 112 is attached to the seal plate 112 contacting the drum member 23 in the above-described embodiment. This is because the drum member which is to be connected to the sleeve member 110 later is the drum member 23.

Embodiment 2

Figure 10:
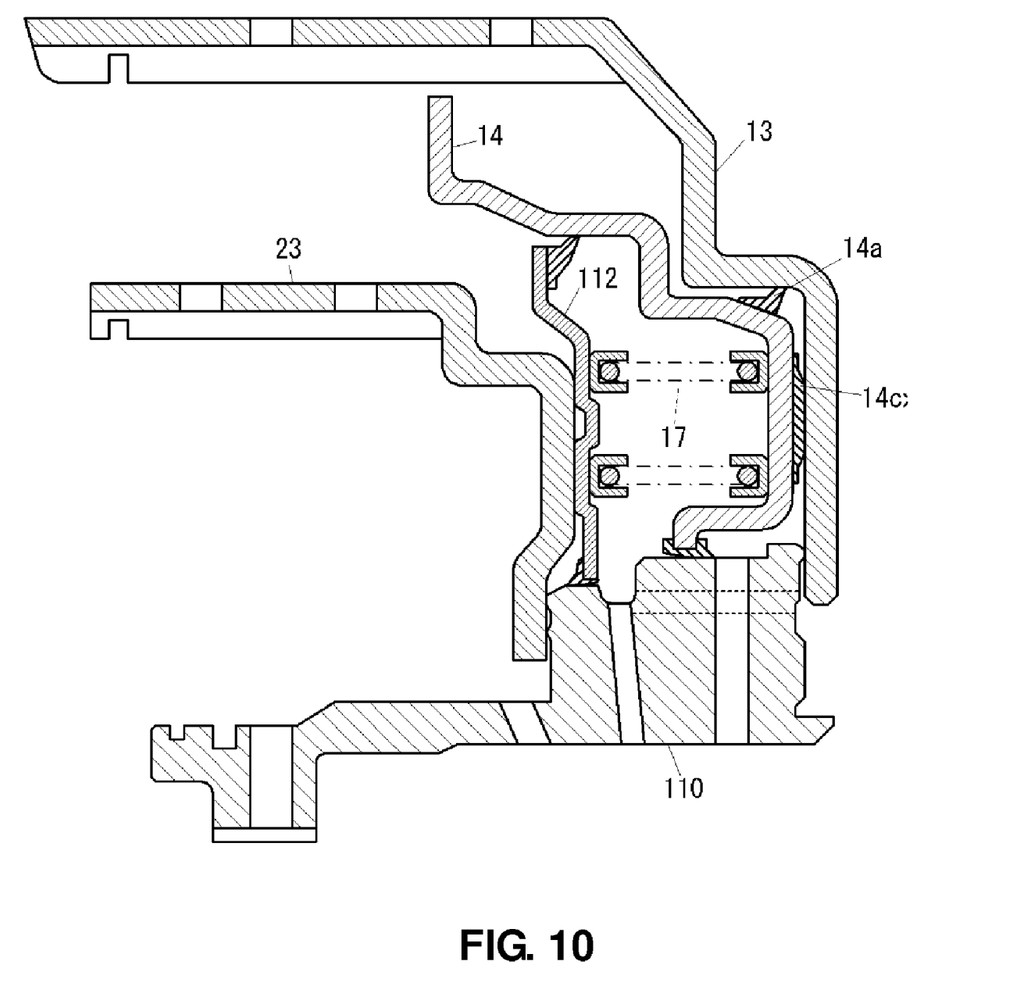
FIG. 10 is a sectional view of a subassembly of an automatic transmission according to a second embodiment.

According to a second embodiment, as shown in FIG. 10, an insulator 14c which electrically insulate the piston from the drum member 13 is attached to the piston 14, and the seal member 14a to seal the gap between the piston 14 and the drum member 13 is made from the electric-insulation material. Thereby, when the drum member 23 is connected to the sleeve member 110, then the seal plate 112, the rerun spring 17, and the piston 14 are assembled to the sleeve member 110, subsequently the drum member 13 is made contact the sleeve member 110 assembled in the axial direction, and finally the electric current for welding is applied to the sleeve member 110 and the drum member 13, the electric current is prevented from flowing through the drum member 23, the seal plate 112, the return spring 17, and the piston 14.

The present invention should not be limited to the above-described embodiments, and any other modifications and improvements may be applied within the scope of a sprit of the present invention.

What is claimed is:

1. A manufacturing method of a clutch for an automatic transmission which comprises two clutches provided on an input side of a transmission mechanism to conduct connection/disconnection between of an input shaft and the transmission mechanism, inner peripheral portions of respective drum members of which are connected to a sleeve member connected to the input shaft at different positions in an axial direction, a piston provided between the both drum members on an outer periphery side of the sleeve member, the piston forming an oil-pressure chamber of one of the clutches with the drum member of said one of the clutches, a seal plate provided between the drum member of the other of the clutches and said piston, the seal plate forming a centrifugal balance oil-pressure chamber of said one of the clutches, and a return spring provided between said piston and said seal plate to bias said piston toward the drum member of said one of the clutches in a state in which one end of thereof is received by the drum member of said other of the clutches via the seal plate, the manufacturing method comprising:

an insulator attaching step of attaching an insulator to either said piston or said seal plate, wherein when the insulator is attached to said piston the insulator provides electric isolation between said piston and the drum member of said one of the clutches, and wherein when the insulator is attached to said seal plate the insulator provides electric isolation between said seal plate and the drum member of said other of the clutches;

a first connecting step of connecting the drum member, to which the electric isolation with said insulator is not applied, to the sleeve member;

an assembling step of assembling said piston, return spring and seal plate to the sleeve member to which the drum member has been connected through said first connecting step to form an assembly; and a second connecting step of connecting the drum member, to which the electric isolation with said insulator has been applied, to the sleeve member of said assembly which has been formed through said assembling step with electric welding.

2. The manufacturing method of a clutch for an automatic transmission of claim 1, wherein the electric welding of said second connecting step is conducted by pressing the drum member to be connected toward the drum member which has been connected through said first connecting step against a biasing force of the return spring assembled in said assembly, making the inner peripheral portion of the drum member to be connected contact an end face of the sleeve member which is formed at a specified position of the sleeve member, and applying an electric current to the drum member and the sleeve member.

3. The manufacturing method of a clutch for an automatic transmission of claim 2, wherein a circular projection for welding of the drum member and another projection which functions as a stopper which is lower than the projection for welding in the axial direction are formed at said end face of the sleeve member, and said electric welding of the second connecting step is conducted until a tip portion of said projection for welding is so molten that an end face of said inner peripheral portion of the drum member comes to contact said projection functioning as a stopper.

4. The manufacturing method of a clutch for an automatic transmission of claim 3, wherein to said seal plate is attached said insulator to cover a back face of the seal plate which faces to the drum member to be electrically isolated from the seal plate and an inner peripheral end of the seal plate in said insulator attaching step.

5. The manufacturing method of a clutch for an automatic transmission of claim 4, wherein said inner peripheral portion of the drum member to be connected in said first connecting step is made in the axial direction contact another end face of the sleeve member which is provided at a different position from said end face of the sleeve member to which the drum member is welded in said second connecting step, and then said connection with electric welding of the drum member to the sleeve member in said second connecting step is conducted.

6. A manufacturing method of a clutch for an automatic transmission which comprises two clutches provided on an input side of a transmission mechanism to conduct connection/disconnection between of an input shaft and the transmission mechanism so as to be disposed side by side in a radial direction, inner peripheral portions of respective drum members of which are connected to a sleeve member connected to the input shaft at different positions in an axial direction, a piston provided between the both drum members on an outer periphery side of the sleeve member, the piston forming an oil-pressure chamber of an outer clutch of the clutches with the drum member of the outer clutch, a seal plate provided between the drum member of an inner clutch of the clutches and said piston, the seal plate forming a centrifugal balance oil-pressure chamber of the outer clutch, and a return spring provided between said piston and said seal plate to bias said piston toward the drum member of the outer clutch in a state in which one end of thereof is received by the drum member of the inner clutch via the seal plate, the manufacturing method comprising:

an insulator attaching step of attaching an insulator to either said piston or said seal plate, wherein when the insulator is attached to said piston the insulator provides electric isolation between said piston and the drum member of said one of the clutches, and wherein when the insulator is attached to said seal plate the insulator provides electric isolation between said seal plate and the drum member of said other of the clutches;

a first connecting step of connecting the drum member of the outer clutch to the sleeve member;

an assembling step of assembling said piston, return spring and seal plate to the sleeve member to which the drum member of the outer clutch has been connected through said first connecting step to form an assembly; and a second connecting step of connecting the drum member of the inner clutch to the sleeve member of said assembly which has been formed through said assembling step with electric welding.

7. The manufacturing method of a clutch for an automatic transmission of claim 6, wherein the electric welding of said second connecting step is conducted by pressing the drum member of the inner clutch toward the drum member of the outer clutch which has been connected through said first connecting step against a biasing force of the return spring assembled in said assembly, making the inner peripheral portion of the drum member of the inner clutch contact an end face of the sleeve member which is formed at a specified position of the sleeve member, and applying an electric current to the drum member of the inner clutch and the sleeve member.

8. The manufacturing method of a clutch for an automatic transmission of claim 7, wherein a circular projection for welding of the drum member and another projection which functions as a stopper which is lower than the projection for welding in the axial direction are formed at said end face of the sleeve member, and said electric welding of the second connecting step is conducted until a tip portion of said projection for welding is so molten that an end face of said inner peripheral portion of the drum member of the inner clutch comes to contact said projection functioning as a stopper.

9. The manufacturing method of a clutch for an automatic transmission of claim 8, wherein to said seal plate is attached said insulator to cover a back face of the seal plate which faces to the drum member of the inner clutch to be electrically isolated from the seal plate and an inner peripheral end of the seal plate in said insulator attaching step.

10. The manufacturing method of a clutch for an automatic transmission of claim 9, wherein said inner peripheral portion of the drum member of the outer clutch in said first connecting step is made in the axial direction contact another end face of the sleeve member which is provided at a different position from said end face of the sleeve member to which the drum member of the inner clutch is welded in said second connecting step, and then said connection with electric welding of the drum member of the inner clutch to the sleeve member in said second connecting step is conducted.

* * * * *